United States Patent
Sano et al.

(10) Patent No.: US 6,246,735 B1
(45) Date of Patent: Jun. 12, 2001

(54) SYNCHRONIZATION DETECTION METHOD FOR DATA TRANSMISSION APPARATUS AND DATA TRANSMISSION APPARATUS USING THE SAME

(75) Inventors: Seiichi Sano, Higashiyamato; Toshiyuki Akiyama; Atsushi Miyashita, both of Tokorozawa; Nobuo Tsukamoto, Akishima, all of (JP)

(73) Assignee: Hitachi Denshi Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/203,564

(22) Filed: Dec. 2, 1998

(30) Foreign Application Priority Data

Dec. 3, 1997 (JP) .................................................. 9-332855

(51) Int. Cl.$^7$ ...................................................... H04L 7/06
(52) U.S. Cl. .......................... 375/364; 375/368; 370/514; 370/520
(58) Field of Search .................................. 375/364, 368, 375/362, 260; 370/514, 520, 208, 281, 483

(56) References Cited

U.S. PATENT DOCUMENTS

| 5,596,582 | * | 1/1997 | Sato et al. ............................. 370/509 |
| 5,619,507 | * | 4/1997 | Tsuda .................................... 370/350 |
| 6,044,277 | * | 3/2000 | Tsuda .................................... 455/522 |

OTHER PUBLICATIONS

S. Moriyama, A Study on Field Pickup Unit using OFDM Modulation Scheme, ITE Technical Report, vol. 19, No. 38, pp. 7–12, Aug. 1995.

* cited by examiner

Primary Examiner—Amanda T. Le
(74) Attorney, Agent, or Firm—Antonelli, Terry, Stout & Kraus, LLP

(57) ABSTRACT

A data transmission apparatus using a digital modulation system wherein a transmitting side inserts a group of predetermined synchronization symbols into a transmission signal at predetermined intervals to be transmitted. A receiving side calculates an electric power value of a received transmission signal. When a no-signal period (null section) in the synchronization symbol group is to be detected and decided from a magnitude of the received signal electric power value, a threshold for reference of decision for detecting the null section is calculated on the basis of an average electric power value for a predetermined period in the received signal electric power value and the threshold calculated in accordance with the received signal level of the transmission signal is used to detect synchronization stably.

25 Claims, 12 Drawing Sheets

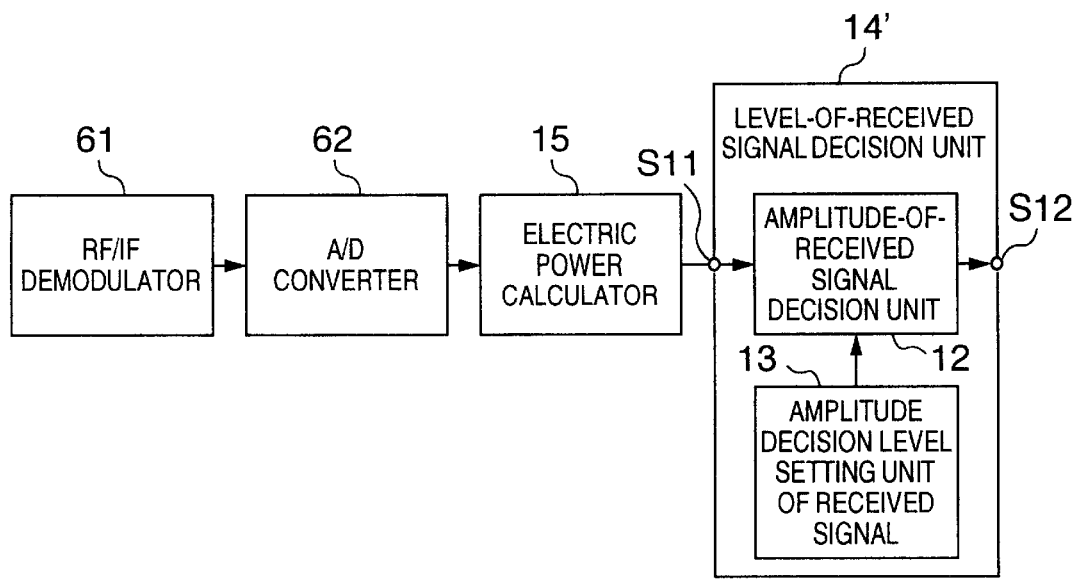
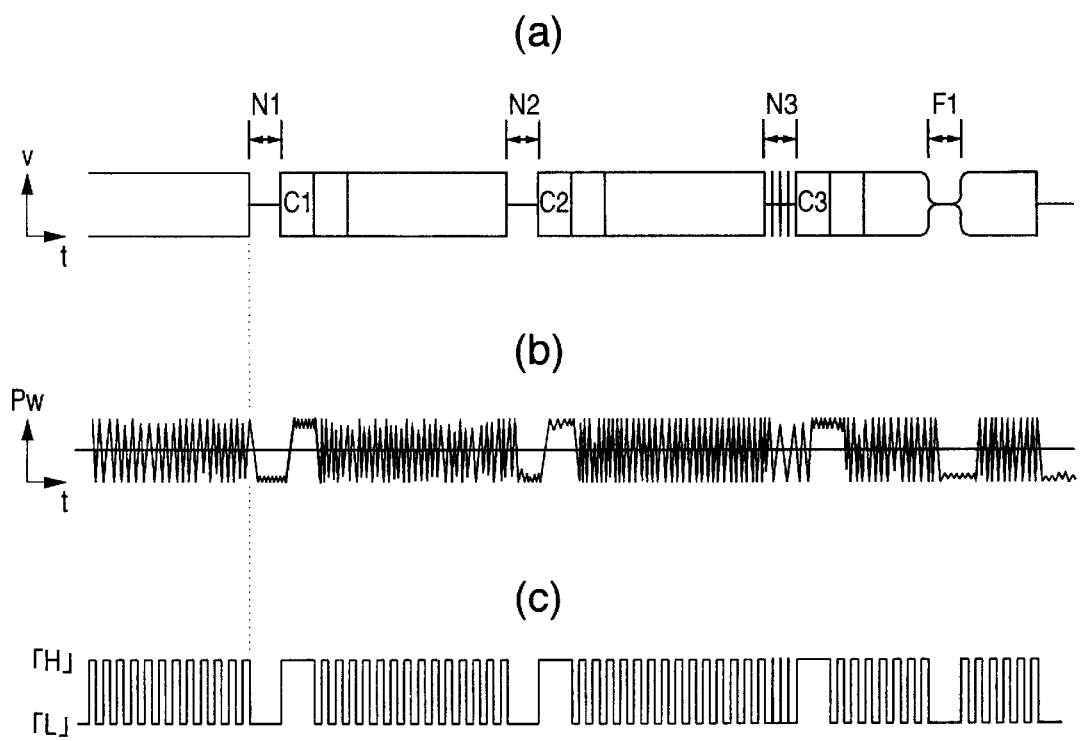

SYNCHRONIZATION DETECTION METHOD FOR DATA TRANSMISSION APPARATUS AND DATA TRANSMISSION APPARATUS USING THE SAME

CROSS-REFERENCES TO RELATED APPLICATIONS

U.S. patent application Ser. No. 09/099,390 filed on Jun. 18, 1998 in the names of Atsushi Miyashita et al., entitled "OFDM MODULATOR AND OFDM MODULATION METHOD FOR DIGITAL MODULATED WAVE HAVING GUARD INTERVAL" and claiming priority based on Japanese Patent Application No. 9-162579 filed on Jun. 19, 1997 and assigned to the same assignee of the present invention is related to the present invention and the disclosure thereof is hereby incorporated by reference.

U.S. patent application Ser. No. 09/198,346 filed on Jun. 17, 1998 in the name of Toshiyuki Akiyama et al., entitled "TRANSMITTING AND RECEIVING METHOD OF ORTHOGONAL FREQUENCY DIVISION MULTI-PLEXED MODULATION SIGNAL AND COMMUNICATION SYSTEM" and claiming priority based on Japanese Patent Application No. 9-161486 and assigned to the same assignee of the present invention is also related to the present invention and the disclosure thereof is hereby incorporated by reference.

U.S. patent application Ser. No. 09/096,454 filed on Jun. 11, 1998 in the name of Seiichi Sano et al., entitled "DATA TRANSMISSION APPARATUS AND RECEIVING APPARATUS USING ORTHOGONAL FREQUENCY DIVISION MULTIPLEX MODULATION SYSTEM" and claiming priority based on Japanese Patent Application No. 9-155591 filed on Jun. 12, 1997 and assigned to the same assignee of the present invention is also related to the present invention and the disclosure thereof is hereby incorporated by reference.

BACKGROUND OF THE INVENTION

The present invention relates to a synchronization detection method of a data transmission apparatus using a digital modulation system and a data transmission apparatus to which the synchronization detection method is applied and more particularly to the technique for improving the accuracy of detection of synchronization of a demodulator in a receiver of a transmission apparatus for transmitting information by means of an orthogonal frequency division multiplex (OFDM) system.

In recent years, as a multiplex system for digital radio communication of mobiles or terrestrial systems, an orthogonal frequency division multiplex (OFDM) system has been getting attention which is characterized to be robust to multi-path fading and ghost.

In the OFDM system, signals obtained by digitally modulating a multiplicity of carrier waves of several tens to several hundreds kinds arranged at intervals of a frequency fs with a symbol frequency fsy (=1/Tsy), that is, OFDM signals (orthogonal frequency division multiplex modulated signals) are used to transmit information codes.

When a transmission signal modulated and transmitted by the OFDM system is received and demodulated on a receiving side, it is first necessary to reproduce or recover synchronization from the received OFDM signal.

For this purpose, the following system has been proposed "A Study of Field Pickup Unit using OFDM Modulation Scheme" by S. Moriyama et al., Institute of Television Engineers of Japan, Technical Report Vol. 19, No. 38, pp. 7–12, August 1995. On a transmission side of this system, there are previously inserted into a starting portion of a frame which is a unit of data transmission processing a null section constituted by a no-signal period and a group of synchronization symbols constituted by a sweep signal or the like having a signal component varying from a maximum frequency to a minimum frequency of a transmission band within a predetermined time. On a receiving side, the null section and the synchronization symbol group are detected to recover synchronization. Further, an example of a specific method of detecting the null section is described in copending U.S. patent application Ser. No. 09/096,454.

SUMMARY OF THE INVENTION

The example of U.S. Ser. No. 09/096,454 is now described in brief with reference to FIG. 1.

The OFDM signal received on the receiving side shown in FIG. 1 is converted into a baseband signal in an RF/IF demodulator 61 to obtain a baseband OFDM signal. A typical waveform of the baseband OFDM signal is shown in FIG. 2(a).

The baseband OFDM signal is converted into a digital signal by an A/D converter 62 and supplied to an electric power calculator 15 in which an electric power value of the received signal is obtained. The electric power value of the received signal is supplied to an input terminal S11 of a level-of-received signal decision unit 14'. A typical waveform of the electric power value of the received signal inputted to the input terminal S11 is shown in FIG. 2(b).

The electric power value is compared with a predetermined decision level previously set in an amplitude-decision-level-of-received signal setting unit 13 by an amplitude-of-received signal decision unit 12 (which can be realized by, for example, a general-purpose logic IC74LS85, although its configuration is not shown).

When the electric power value of the received signal supplied to the input terminal S11 is smaller than the decision level set in the decision level setting unit 13, the amplitude decision unit 12 produces an "L" level signal and when the electric power value is larger than the decision level, the amplitude decision unit 12 produces an "H" level signal.

The output signal of the amplitude decision unit 12 is produced to an output terminal S12. A typical waveform at the output terminal S12 is shown in FIG. 2(c). Since an electric power value in null sections N1 and N2 of the baseband OFDM signal shown in FIG. 2(a) is 0, the decision result of the null sections becomes continuous "L" level as shown in FIG. 2(c).

That is, when the "L" level continues during a predetermined length, this system confirms the existence of the null section and recovers synchronization.

When such a data transmission apparatus is moved during operation, noise is sometimes mixed into signals received in the receiving side, so that a C/N ratio is reduced or level variation occurs due to fading.

The level variation of the received signal is normally reduced by the provision of an AGC (Automatic Ga in Control) circuit in the RF/IF demodulator 61. However, when the period of the level variation of the received signal is long, the AGC circuit cannot fully follow the level variation varying from a short period to a long period to be assumed. Therefore, the level variation remains in the signal after the AGC processing. For example, when it is assumed that the level variation of the received signal which has been subjected to the AGC processing is a standard signal level ±3 dB, the level of the received signal is varied in the range from two times the standard signal level to a half thereof.

A relation of an electric power value of the received signal in the null section and the predetermined decision level (threshold) set in the decision level setting unit 13 is now described with reference to FIGS. 3A and 3B. FIG. 3A shows an example of an electric power value of the received signal in case where any level variation does not occur and numeral 115 represents a null section.

In order to decide and detect the null section, the threshold 45 is set between an electric power value of a supposed fixed received signal in a data transmission section and an electric power value of the received signal in the null section 115, so that the time when the electric power value of the received signal is smaller than or equal to the threshold continues during a predetermined length in the case of FIG. 3A and accordingly the null section can be detected.

However, the electric power value of the received signal is varied as described above. For example, as shown in FIG. 3B, when the received signal level is increased and noise in the null section is also increased due to variation of a gain of the AGC circuit not shown, the electric power value of the received signal in the null section 115 exceeds the threshold 45.

Therefore, the electric power value of the received signal in the null section is not smaller than the threshold level continuously during the predetermined period. Consequently, there occurs the problem that the null section cannot be detected.

As described above, when the threshold for deciding a magnitude of the electric power value of the received signal is fixed, the null section cannot be sometimes detected when the electric power value of the received signal is varied.

A relation of the electric power value of the received signal having the level variation or noise mixed therein and the threshold for deciding a magnitude of the electric power value of the received signal is described with reference to FIG. 4.

The abscissa of the graph of FIG. 4 represents the electric power value (Pin) of the received signals and the ordinate thereof represents the threshold (Thd) for deciding a magnitude of the electric power value of the received signal.

T1 of FIG. 4 represents the maximum threshold corresponding to the electric power value of the received signal when there is only a little noise (C/N ratio is several tens dB) and with which the null section can be detected. T2 represents the maximum threshold corresponding to the electric power value of the received signal when noise is mixed in the received signal (C/N ratio is 0 dB, for example) and with which the null section can be detected. T3 represents the lowest limit of the threshold corresponding to the electric power value of the received signal when noise is mixed in the received signal and with which the null section can be detected. T4 represents the lowest limit of the threshold corresponding to the electric power value of the received signal when there is only a little noise and with which the null section can be detected.

As apparent from FIG. 4, it is understood that a set range of the threshold with which the null section can be detected is within the range between the thresholds T2 and T3 in consideration of mixing of noise and the actual threshold is set to T5 which is intermediate between the thresholds T2 and T3.

It is an object of the present invention to provide a synchronization detection method and a data transmission apparatus capable of detecting a null section exactly even if a level of a received signal is varied due to mixing of large noise and occurrence of multi-path fading and capable of detecting synchronization stably even in a transmission path having bad conditions in consideration of the above-mentioned drawbacks.

In order to achieve the above object, in a synchronization detection method according to an aspect of the present invention, a threshold for detection of a null section is adapted to be varied as shown by T5 of FIG. 4 in accordance with a magnitude of an electric power value of a received signal.

More particularly, in a data transmission apparatus using the digital modulation system, a group of predetermined synchronization symbols is inserted into a transmission signal at predetermined intervals on a transmission side and the transmission signal having the predetermined synchronization symbol group inserted therein is transmitted. On a receiving side, when an electric power value of a received signal of the transmission signal is determined and a no-signal period (null section) in the synchronization symbol group is detected and decided from a magnitude of the electric power value of the received signal, a threshold for a reference of decision for detecting the null section is successively calculated on the basis of an average electric power value for each predetermined period in the electric power value of the received signal so that the threshold calculated in accordance with a received signal level of the transmission signal is used to detect synchronization.

Further, according to another aspect of the present invention, a data transmission apparatus using the orthogonal frequency division multiplex modulation system in which a predetermined synchronization symbol group is inserted into a transmission signal at predetermined intervals in a transmitter and an electric power value of the transmission signal received by a receiver is determined to detect and decide the no-signal period (null section) in the synchronization symbol group on the basis of a magnitude of the electric power value of the received signal in a receiver so that synchronization is recovered in the receiver on the basis of the decided result, comprises average electric power value calculation means for successively calculating an average electric power value for each predetermined period in the electric power value of the received signal, threshold calculation means for successively calculating a threshold for decision for detecting the null section on the basis of the calculated average electric power value, and comparison means for comparing the received signal of the transmission signal with the calculated threshold, whereby the threshold calculated in accordance with the received signal level of the transmission signal is used to recover synchronization.

Preferably, the calculation of the average electric power value in the average electric power value calculation means is performed every N times (N is a natural number) of a symbol period of the transmission signal.

Further, it is preferable that there is provided delay means for delaying the calculated average electric power value and the delay of the average electric power value in the delay means is made equal to c times (c is a positive real number) of the symbol period of the transmission signal so that the delayed average electric power value is used to calculate the threshold.

Moreover, when the delayed average electric power value is p, the threshold calculation means preferably calculates the threshold on the basis of p×a+b (a and b are real numbers).

Consequently, the threshold can be varied in accordance with the received signal level. That is, when the received signal level is low, the threshold is reduced and when the received signal level is high, the threshold is increased. Accordingly, even when the received signal level is varied, the null section can be detected exactly.

Further, since an average electric power value of the received signal during a predetermined symbol period is calculated so that the null section is detected by using the calculated average electric power value, level variation (for example, remaining level variation of an AGC following fading) in a short period of about several-symbol time can be absorbed to improve the detection accuracy of the null section.

In addition, since the threshold for decision for detecting the null section is calculated from the average electric power value delayed by a predetermined symbol period, the threshold becomes an average electric power value in the data symbol period and the null section can be detected exactly since the average electric power value (substantially zero value) of the null section is not used.

Furthermore, since the threshold calculated from the average electric power value is shifted on the basis of a predetermined conversion equation, the threshold can follow the received signal level even when the received signal level is varied and accordingly the null section can be detected securely.

BRIEF DESCRIPTION OF THE DRAWINGS

FIG. 1 is a block diagram schematically illustrating a receiver side;

FIG. 2 is a waveform diagram useful to explain operation of the receiver side shown in FIG. 1;

DETAILED DESCRIPTION OF THE PREFERRED EMBODIMENTS

Figure 3A:
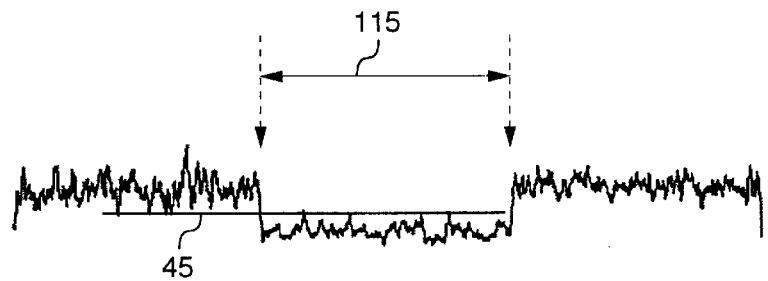
FIGS. 3A and 3B are waveform diagrams useful to explain a relation between a received signal level and a threshold.
Figure 3B:
Figure 4:
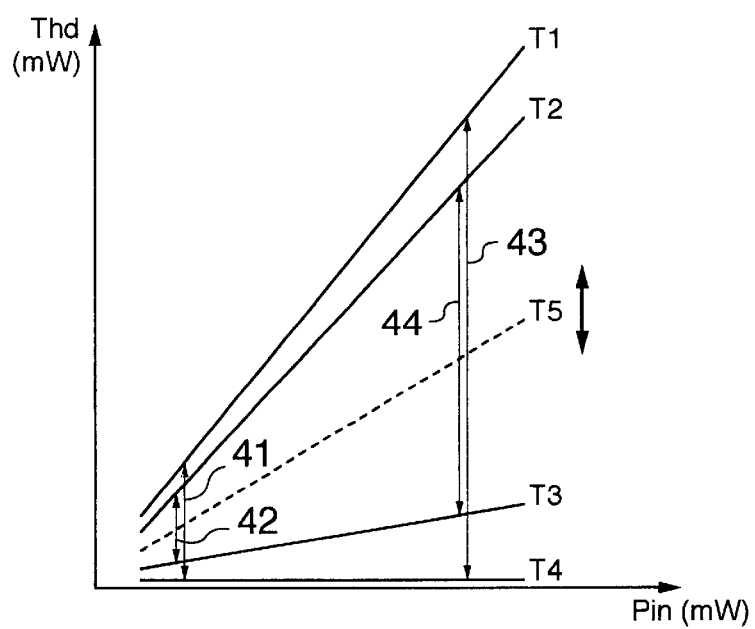
FIG. 4 is a graph showing a relation between received signal levels and thresholds according to the present invention.
Figure 5:
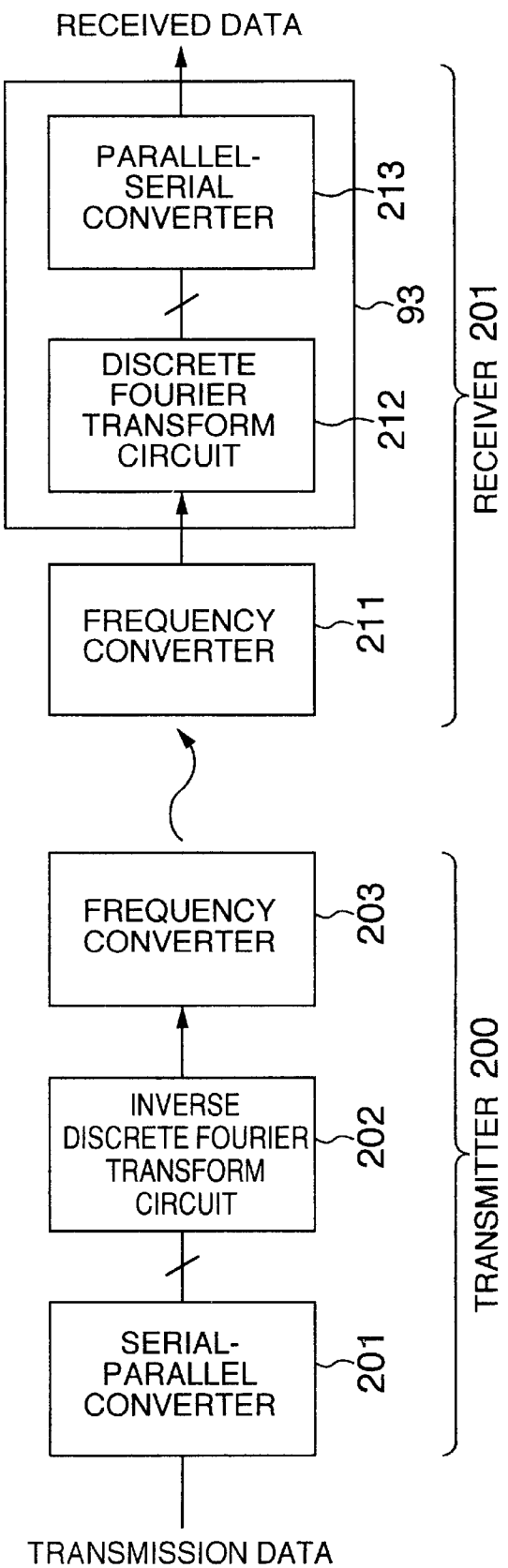
FIG. 5 is a block diagram schematically illustrating a transmission apparatus of an OFDM system to which the present invention is applied.

Referring first to FIG. 5, a transmitter 200 and a receiver 210 of an OFDM system to which the present invention is applied are described. In the transmitter 200, series-arranged transmission data are supplied to a serial-parallel converter 201 to be converted into parallel-arranged transmission data, which are supplied to an inverse discrete Fourier transform circuit 202 to be inverse Fourier transformed. A synchronization signal and the like are added to the inverse Fourier transformed signal in a frequency conversion unit 203, so that the signal is converted into a signal in a frequency band for transmission and is outputted from the transmitter 200.

In the receiver 210, the data of the transmission frequency transmitted from the transmitter 200 is converted into a baseband OFDM signal by a frequency conversion unit 211 to be subjected to processing such as synchronization detection. An output signal of the frequency conversion unit 211 is supplied to an OFDM demodulator 93 and is subjected to the discrete Fourier transform in a discrete Fourier transform circuit 212 in the OFDM demodulator 93 to produce received data.

Figure 6:
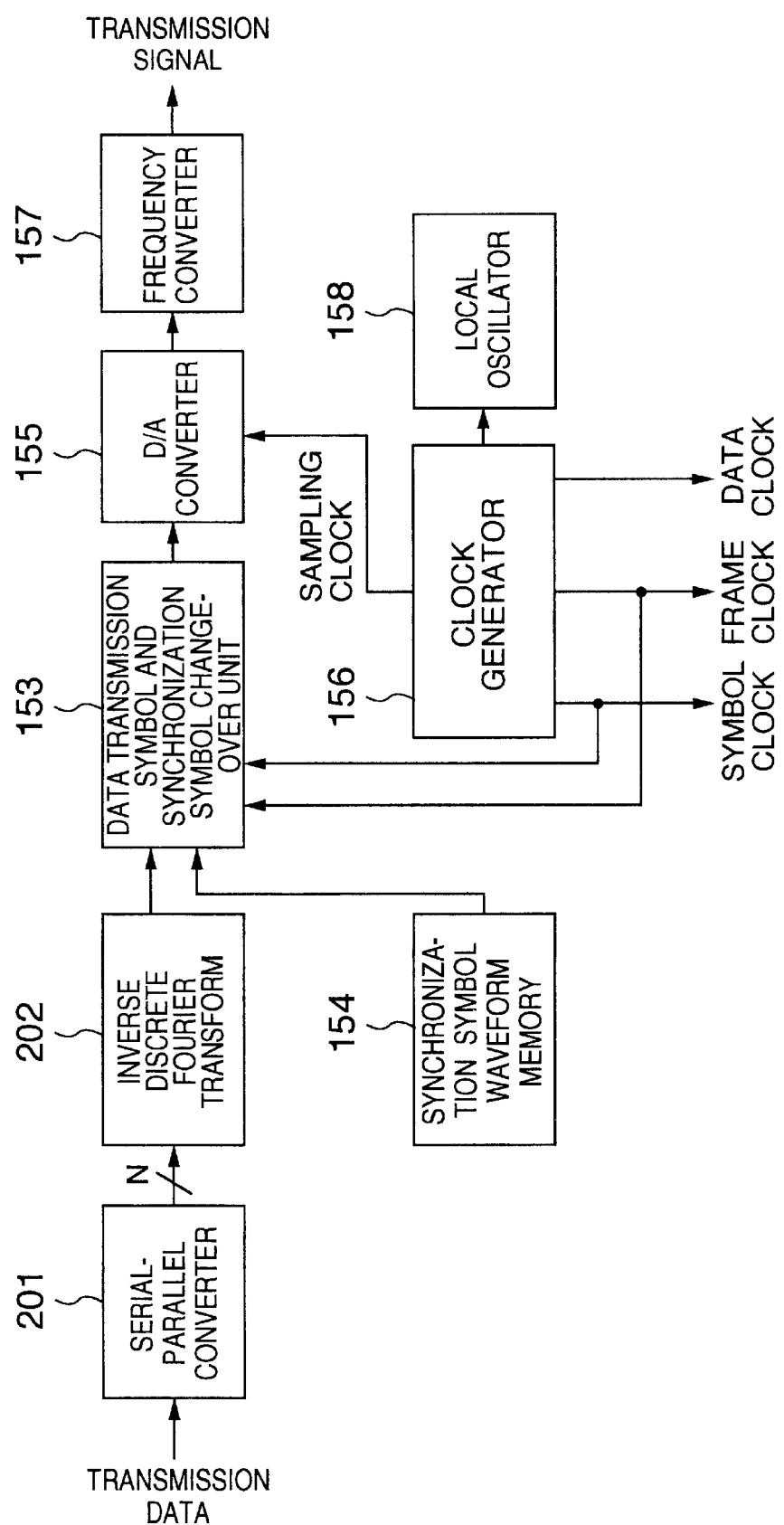
FIG. 6 is a block diagram schematically illustrating a transmitting unit of the transmission apparatus of FIG. 5.
Figure 7:
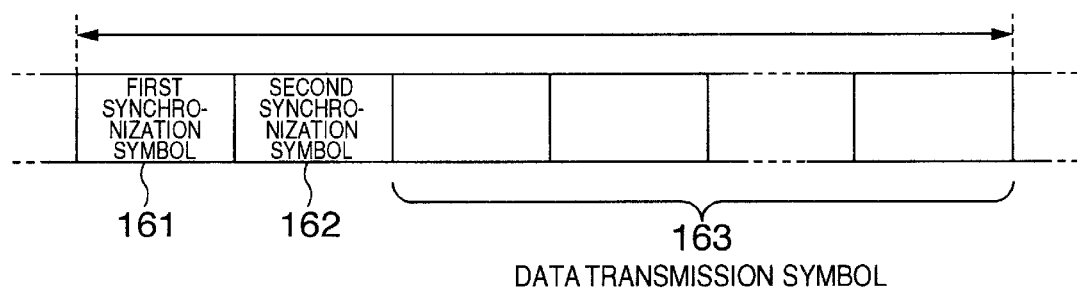
FIG. 7 shows a data structure of a transmission signal from the transmitting unit of FIG. 6.
Figure 8:
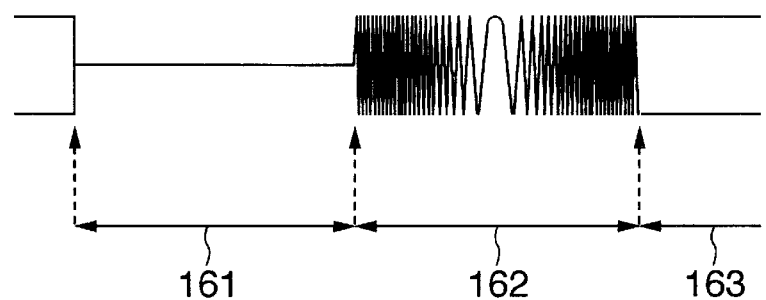
FIG. 8 shows a conclete example of a synchronization symbol inserted into the transmission signal of FIG. 7.

Referring now to FIGS. 6, 7 and 8, a configuration of the transmitter of a data transmission apparatus according to the present invention is described.

FIG. 6 schematically illustrates an internal configuration of the transmitter 200 of FIG. 5 in detail.

In the transmitter 200, the series-arranged transmission data are supplied to the serial-parallel converter 201 to be converted into the parallel-arranged transmission data, which are supplied to the inverse discrete Fourier transform circuit 202 to be inverse Fourier transformed.

A data transmission symbol and synchronization symbol change-over unit 153 selects the transmission signal obtained by the inverse Fourier transform and a synchronization symbol produced by a synchronization symbol waveform memory 154. FIG. 7 shows a format of the transmission signal selected by the change-over unit 153. A frame which is a unit for data transmission includes a first synchronization symbol 161, a second synchronization symbol 162 and a data transmission symbol 163. A particular example of signals of the first and second synchronization symbols 161 and 162 is shown in FIG. 8. The first synchronization symbol 161 is a null signal. The second synchronization symbol 162 is a sweep signal varying from a maximum frequency to minimum frequency within the transmission bandwidth for the transmission signal. The signal produced from the change-over unit 153 is converted into an analog signal by a D/A converter 155 and is converted into a predetermined frequency by a frequency conversion unit 157 to produce a transmission signal. A local oscillator 158 and a clock generator 156 produce clocks for operating each block of the transmitter.

Figure 9:
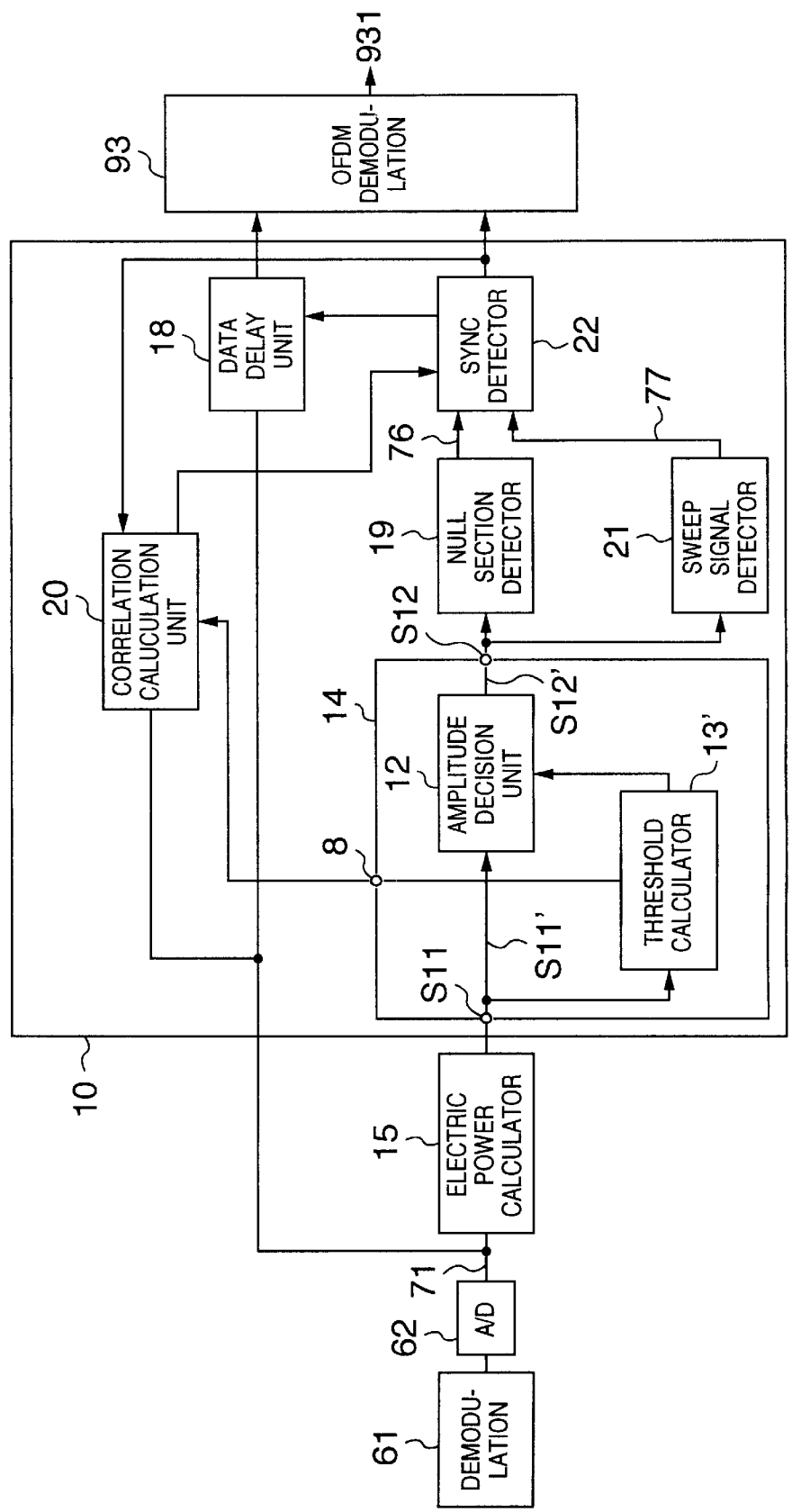
FIG. 9 is a block diagram schematically illustrating a demodulation unit of a receiver according to an embodiment of a data transmission apparatus of the present invention.

Referring now to FIG. 9, a configuration of the demodulator of the receiver of an embodiment of the data transmission apparatus of the present invention is described. The signal transmitted from the OFDM transmitter is converted into an IF frequency signal by an RF/IF demodulator 61 to be demodulated to an OFDM baseband signal 71. The OFDM baseband signal 71 is converted into a digital signal by an A/D converter 62. An output signal of the A/D converter 62 is supplied to an electric power calculator 15, in which an electric power value for each predetermined period is calculated successively. An output signal of the electric power calculator 15 is supplied to a level-of-received signal decision unit 14 and is compared in an amplitude-of-received signal decision unit 12 (for example, general-purpose logic IC 74LS85) within the unit 14 with a decision level calculated by an amplitude-decision-threshold-of-received signal calculation circuit 13' to produce a signal S12'. The output signal of the electric power calculator 15 may be supplied to the level-of-received signal decision unit 14 through a low pass filter not shown in order to reduce noise contained in the output signal of the electric power calculator 15. S11 and S12 represent input and output terminals of the decision unit 14, respectively.

The amplitude-of-received signal decision unit 12 is now described with reference to FIGS. 10 and 11.

Figure 10:
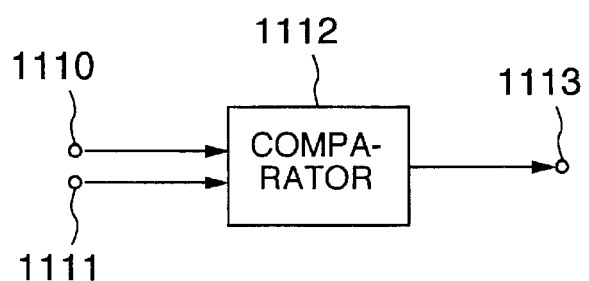
FIG. 10 is a block diagram schematically illustrating an amplitude-of-received signal decision unit in the demodulation unit of the receiver of FIG. 9.

In FIG. 10, the output signal of the electric power calculator 15 is supplied to an input terminal 1110 of FIG. 10. Further, in order to decide a magnitude of the input signal, the threshold value calculated and set by the threshold calculator 13' is supplied to an input terminal 1111. A comparator 1112 compares the signal supplied to the input terminal 1110 with the signal supplied to the input terminal 1111 and produces an "H" level signal to a decided result output 1113 when the signal of the input terminal 1111 is larger than the signal of the input terminal 1110. Further, the comparator 1112 compares the signal of the input terminal 1110 with the signal of the input terminal 1111 and produces an "L" level signal to the decided result output 1113 when the signal of the input terminal 1111 is smaller.

Figure 11:
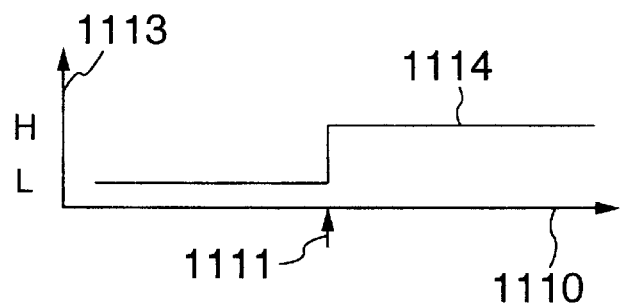
FIG. 11 is a diagram showing a signal level at a portion of the amplitude-of-received signal decision unit of FIG. 10.

FIG. 11 is a graph showing a relation of the input terminals 1110 and 1111 and the decided result output 1113. A signal level (received signal) at the input terminal 1110 is represented by the abscissa and a signal level at the decided result output 1113 is represented by the ordinate. When a signal level at the input terminal 1111 (threshold) is set as shown in FIG. 11, the signal level at the decided result output 1113 varies from "H" level to "L" level with respect to the signal level at the input terminal 1111 as shown by an output waveform 1114.

As has been described above, the signal S12' is low level when the signal S12' is smaller than the set decision level and the signal S12' is high level when the signal S12' is larger than the decision level. The signal S12' is supplied to a null section detector 19 constituted by a random walk counter (for example, general-purpose logic IC 74LS191) a value of which is increased when an input thereto is low level and is reduced when the input is high level.

Figure 12:
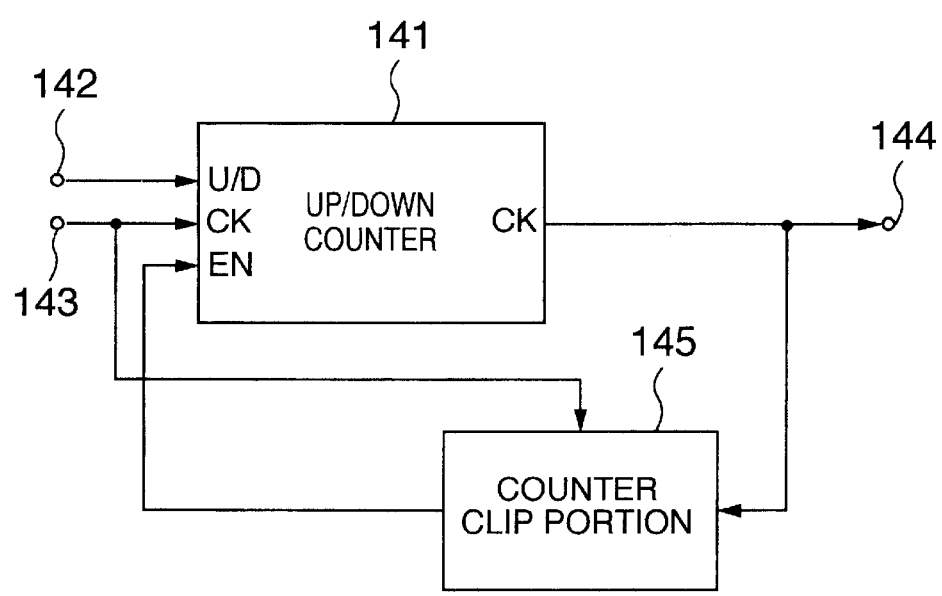
FIG. 12 is a block diagram schematically illustrating a null section detector in the demodulation unit of the receiver of FIG. 9.

Operation of the random walk counter is now described with reference to FIG. 12. The random walk counter is composed of an up/down counter portion 141 and a counter clip portion 145. A signal inputted to an input terminal 142 is supplied to an up/down selection terminal of the up/down counter 141. A clock for operating the up/down counter 141 is inputted to a clock terminal 143. Whether the signal inputted to the input terminal 142 is "H" or "L" is judged at the timing of the clock inputted to the clock terminal 143. When the signal is "H", the value of the up/down counter 141 is increased and when the signal is "L", the value of the up/down counter is reduced. The counter clip portion 145 is supplied with an output signal 144 of the up/down counter and the input signal inputted to the input terminal 142. When a count of the up/down counter 141 reaches a maximum value, the counter clip portion 145 controls an enable terminal EN of the up/down counter 141 to "L" so that the maximum value is held to prevent the up/down counter 141 from continuing the count-up operation and from returning to a minimum value. Further, when a count of the up/down counter 141 reaches a minimum value, the counter clip portion 145 controls the enable terminal EN of the up/down counter 141 to "L" so that the minimum value is held to prevent the up/down counter 141 from continuing the count-down operation and from returning to the maximum value.

When a count of the random walk counter exceeds a predetermined prescribed value, it is judged that the section deemed to be null is detected and the null section detector 19 produces a null section detection signal 76.

Further, the signal S11' (OFDM signal) of FIG. 9 is compared with the threshold calculated by the threshold calculator 13' and accordingly in order to be able to judge the end of the null section clearly, predetermined synchronization signals C1, C2 and C3 are inserted after the null sections N1, N2 and N3, respectively, as shown by the received OFDM signal of FIG. 2(a). The synchronization signals C1, C2 and C3 may be a sweep signal having the maximum amplitude of the OFDM signal as described above.

When a sweep signal detector 21 shown in FIG. 9 detects the leading edge of the sweep signals C1, C2 and C3, the sweep signal detector 21 produces signals 77 for notifying detection of the sweep signals or the end of the null sections. The sweep signal detector 21 may use a configuration disclosed in U.S. patent application Ser. No. 09/096,454. Only when a synchronization detector 22 detects the null section detection signal 76 of the null section detector 19 and the sweep signal detection signal 77 produced by the sweep signal detector 21 in a pair, the synchronization detector 22 judges that a right synchronization signal is detected and distributes a synchronization signal 931 to each block of the receiver 210.

Figure 13:
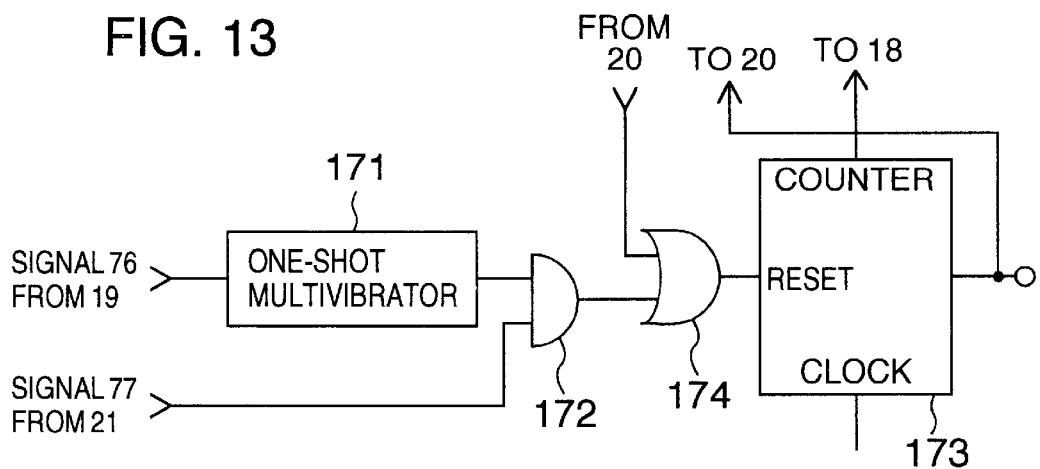
FIG. 13 is a block diagram schematically illustrating a synchronization detector or a timing setting unit in the demodulation unit of the receiver of FIG. 9.

FIG. 13 is a block diagram illustrating the synchronization detector or timing setting unit 22. In FIG. 13, numeral 171 denotes a one-shot multivibrator, 172 an AND gate, and 173 a counter which receives an output signal of the AND gate 172 as a reset input. The null section detection signal 76 is applied to one input of the AND gate 172 through the one-shot multivibrator 171 and the sweep signal detection signal 77 is also applied to the other input of the AND gate 172. With this configuration, only when both the signals 76 and 77 are detected in a pair, the counter 173 outputs the synchronization signal.

In order to synchronize the receiver with the transmitter, the clock generator in the receiver is controlled so that the frequency and the phase of the clock of the receiver follow the frequency and the phase of the clock of the transmitter. In this control, correlation calculation of the sweep signal received by the receiver and the sweep signal set beforehand in the receiver is made to calculate a frequency difference and a phase difference of the clocks of the receiver and the transmitter, so that the clock generator in the receiver is controlled by the calculated differences. This control may use the method disclosed in U.S. patent application Ser. No. 09/096,454.

Note, in the above processing, that there occurs a delay until the detected result of synchronization is produced after the output of the A/D converter 62 has been inputted to the controller 10 for demodulator due to processing of the digital signal. Accordingly, a data delay unit 18 delays the OFDM digital signal inputted to the controller 10 for demodulator in accordance with the synchronization detector 22 to match the output of the synchronization detector 22 to the phase. Outputs of the data delay unit 18 and the synchronization detector 22 are fed to the OFDM demodulator 93 to demodulate the OFDM digital signal.

In the processing that the sweep signal subsequent to the null section is detected to attain synchronization, there is a case where the position of the start point of the sweep signal is judged in error due to noise mixed in the null section and the sweep signal subsequent to the null section when the start point of the sweep signal is to be detected.

As a countermeasure thereof, it is necessary to widen the range of the correlation calculation of the sweep signal and detect the exact position of the start point of the sweep signal. The correlation calculation of the sweep signal is performed by a correlation calculation unit 20 of FIG. 9. The correlation calculation unit 20 will be described in detail later.

For such a reason, when the C/N ratio of the received signal is low and noise is mixed in the null section and the sweep signal subsequent to the null section, so that the exact start point of the sweep signal cannot be detected, it is necessary that the correlation calculation of the sweep signal of a wide section in which the number of samples larger than or equal to the number of samples between the exact start point of the sweep signal and the point judged in error as the start point of the sweep signal is added is performed to detect the synchronization point, resulting in an enlargement of the scale of the correlation calculation processing of the sweep signal.

In view of such, a majority decision type edge detector disclosed in U.S. patent application Ser. No. 09/096,454 may be inserted in place of the sweep signal detector 21 of FIG. 9, so that the detection accuracy of the start point of the sweep signal subsequent to the null section is further improved.

The OFDM baseband signal inputted to the amplitude decision unit 12 is compared with the threshold calculated by the threshold calculator 13' and the result signal of the comparison is supplied to the null section detector 19 and the sweep signal detector 21. The null section detector 19 detects the null section and the sweep signal detector 21 detects the start of the sweep signal.

When both of the null section detection signal of the null section detector 19 and the sweep signal detection signal of the sweep signal detector 21 are detected, the synchronization detector 22 judges that the exact synchronization is detected and distributes the synchronization signal 931 to each block of the receiver 210 shown in FIG. 5.

In the above example, while the sweep signal subsequent to the null section is used as the synchronization symbol group, any signals containing only one carrier signal having a fixed level or the like may be used as the signal subsequent to the null section.

Figure 14:
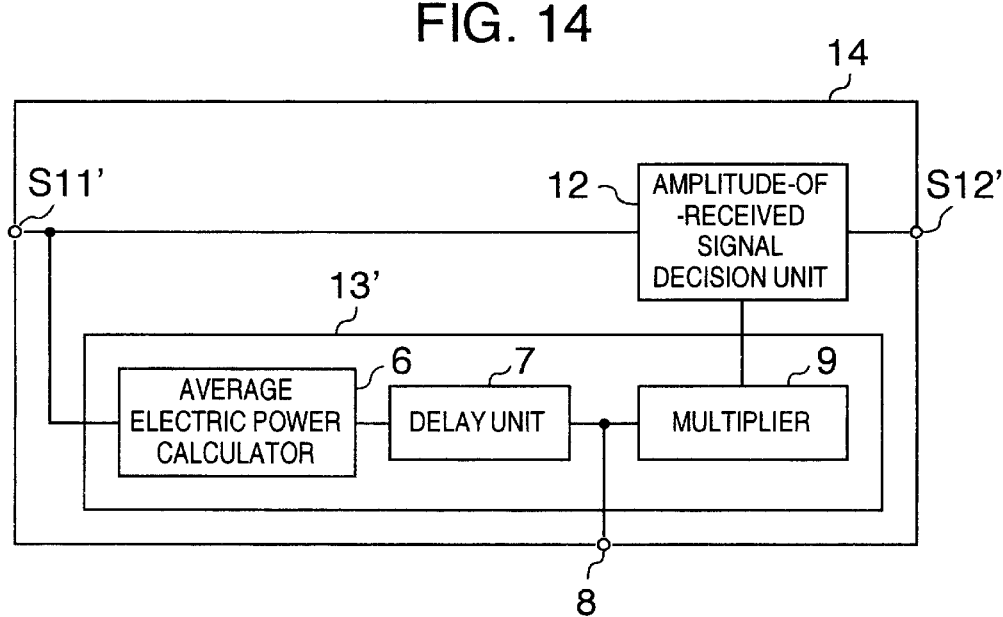
FIG. 14 is a block diagram schematically illustrating an embodiment of a level-of-received signal decision unit according to the present invention.

An embodiment of the decision and detection of the null section which is a feature of the present invention is now described with reference to FIG. 14. FIG. 14 is a block diagram illustrating the level-of-received signal decision unit 14 shown in FIG. 9 with the threshold calculation circuit 13' being illustrated in detail. The level decision unit 14 provided in the receiver side compares an electric power value of the received signal with the threshold, so that whether the time when the electric power value of the received signal is smaller than the threshold continues for a predetermined length or not is judged to detect the null section. In this example, the threshold is adapted to be able to be varied in accordance with a magnitude of the electric power value of the received signal.

The electric power value of the received signal calculated from the signal received in the receiver side is first applied to the input terminal S11 of the level-of-received signal decision unit 14 of the adaptive type.

An average electric power calculator 6 calculates an average electric power value for each symbol, for example, on the basis of the electric power value of the received signal applied to the input terminal S11.

Further, the average electric power value calculated by the average electric power calculator 6 is delayed by a delay unit 7 by a predetermined time (for example, one symbol period) to be produced as a delayed average electric power value.

The delayed average electric power value is multiplied by a predetermined coefficient in a multiplier 9 to produce a threshold in accordance with the average electric power value of the received signal and the threshold is supplied to the amplitude-of-received signal decision unit 12. The delayed average electric power output 8 is an output of the delay unit 7. The delay unit 7 may be structured by a shift register composed of registers connected in series to one another into the multi-stage.

The amplitude-of-received signal decision 12 compares the electric power value of the received signal supplied from the input terminal S11 with the threshold having a level varied in accordance with the average electric power value of the received signal supplied from the multiplier 9 and the comparison result is outputted from the output terminal S12.

Figure 15:
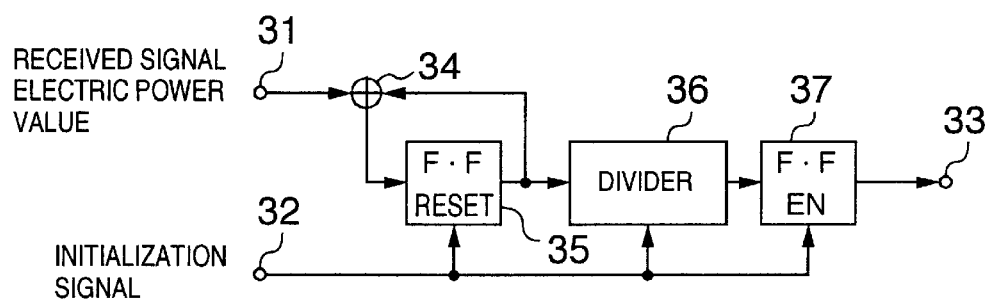
FIG. 15 is a block diagram schematically illustrating an embodiment of an average power calculator.

An embodiment of the average electric power calculator 6 is now described with reference to FIG. 15. The electric power value (signal supplied to the input terminal S11 of FIG. 14) of the received signal supplied to an input terminal 31 of the average electric power calculator 6 is accumulated or added up by a cyclic type integrating unit composed of an adder 34 and a multiply-and-add type flip-flop (F.F) 35.

The accumulated result is divided by a divider 36 at intervals of occurrence of an initialization signal 32 (supplied at regular intervals).

The divided result is taken in a flip-flop (F.F) 37 in response to the initialization signal 32 and produced from an output terminal 33. The initialization signal 32 is a signal generated at a symbol timing produced from a system clock provided in the receiver. Further, since the multiply-and-add type flip-flop 35 has a built-in loop, the flip-flop 35 is initialized (reset) by the initialization signal 32.

The reason why the delay unit 7 of FIG. 14 is required is now described with reference to FIG. 16. First, the electric power value of the received signal is supplied to the input terminal S11 of the level-of-received signal decision unit 14 of the adaptive type of FIG. 14. The electric power value of the received signal is shown in FIG. 14(*a*). (N−1), (N), (1), (2) and (3) represent numbers of data symbols. A null section 115 exists between (N) and (1).

The average electric power calculator 6 calculates an average value of the electric power value of the received signal inputted to the input terminal S11 for each symbol. The average electric power value is shown in FIG. 16(b). The timing that the average electric power value is calculated for each symbol as shown in FIG. 16(b) is not coincident with the actual symbol timing of the received signal shown in FIG. 16(a).

The threshold for detecting and deciding the null section in the received signal supplied to the input terminal S11 is calculated on the basis of the calculated average electric power value.

Figure 16:
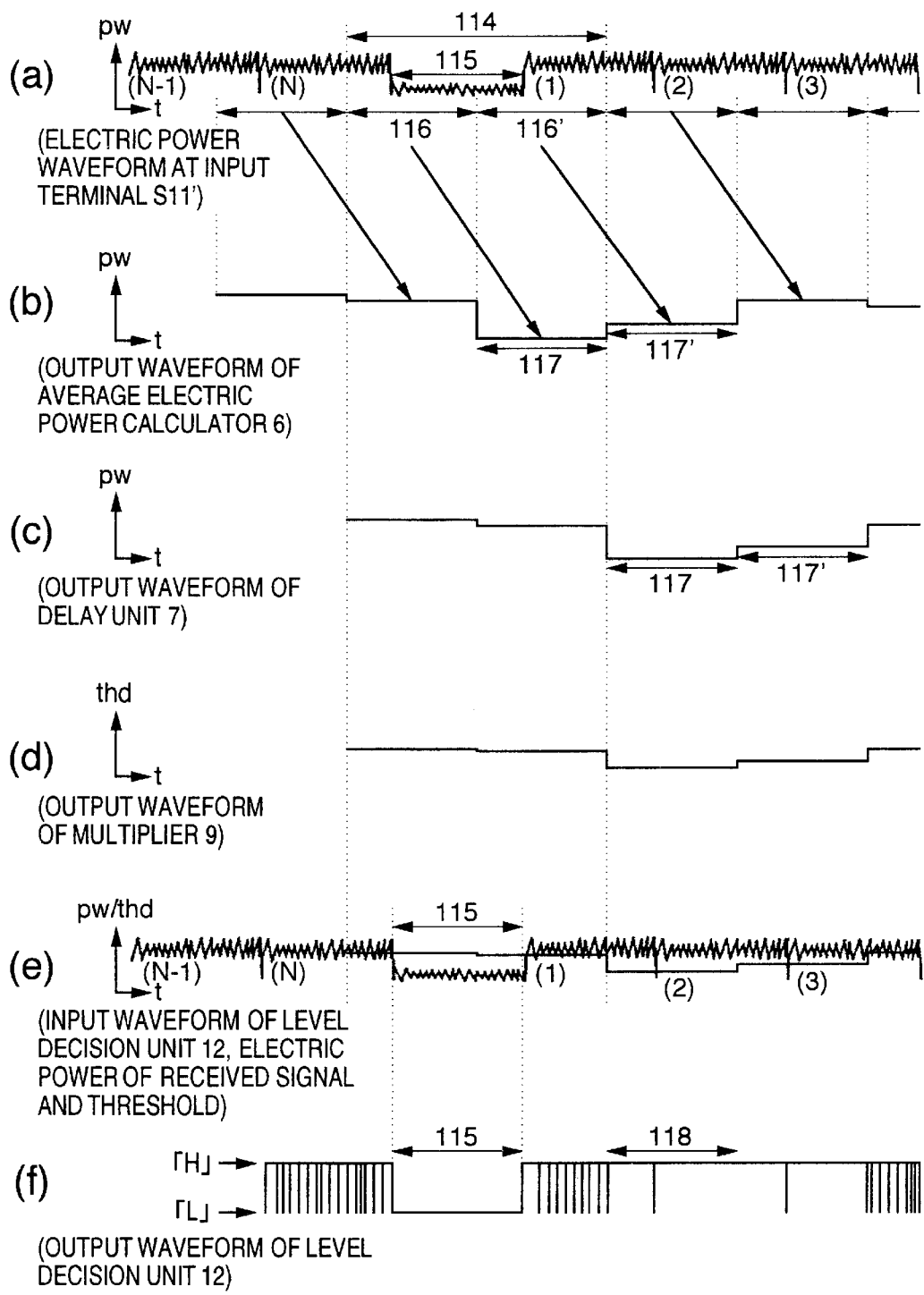
FIG. 16 shows waveforms useful to explaining detection operation of a null section according to the present invention.

In order to exactly decide the null section, he electric power value of the received signal is compared for a section or period represented by a threshold decision term 114 of FIG. 16, that is, for each of former and latter sections (116, 116') of one symbol length each or so with respect to the null section 115 of the received signal with the threshold calculated from the average electric power value taken from data symbol section(s) equal in number to the former or latter sections, so that a magnitude of the electric power value of the received signal is decided.

Note that in the above description, the section for calculating the average electric power value is defined to one symbol, while when the section for calculating the average electric power is lengthened, variation of the average electric power value is reduced so that detection of the null section is less liable to be influenced by level variation produced by fading or the like.

More specifically, in order not to decide the electric power value of the received signal in error, it is necessary that the average electric power values 117 and 117' in the sections 116 and 116' containing the null section 115 in which the average electric power value is substantially zero be not included in the threshold decision term 114.

The reason thereof is as follows. Since the electric power value of the received signal in the null section 115 shown in FIG. 16(a) is substantially zero, the average electric power values 117 and 117', calculated by the average electric power calculator 6, in the sections 116 and 116' containing the null section of FIG. 16(b) are also near zero and in this state the section of the average electric power value 117 having the average electric power value near zero is included in the threshold decision term 114.

Therefore, in order to improve this, the delay unit 7 of FIG. 14 delays the average electric power value calculated by the average electric power calculator 6 by a predetermined period (in this embodiment, one symbol). The delayed average electric power value is shown in FIG. 16(c).

Since the delayed average electric power value is used to decide the threshold, it can be prevented that the average electric power value 117 substantially equal to zero and appearing in the threshold decision term 114, that is, the term containing the null section is used as the threshold for detecting the null section.

While in the above description, the average electric power value is delayed by one symbol by way of example, the point is that it is necessary to prevent the null section of the received signal from being decided on the basis of the average electric power value of the null section itself in order to exactly detect the null section. Thus, the delay amount of the average electric power value equal to or longer than one symbol satisfies the condition for detecting the null section. However, the longer the delay amount, the longer the interval between the symbol in which the average electric power value is calculated and the null section, so that detection of the null section is apt to be influenced by level variation caused by fading or the like and accordingly the delay of the average electric power value may be preferably set up to two to three symbols.

The delayed average electric power value produced by the delay unit 7 is level converted by the multiplier 9 as described later to obtain a threshold for decision for detecting the null section. The threshold is shown in FIG. 16(d).

Figure 21:
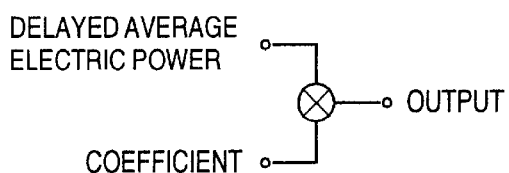
FIG. 21 is a block diagram schematically illustrating a multiplier in the received signal decision unit shown in FIGS. 14 and 18.

FIG. 21 is a block diagram illustrating a configuration of the multiplier 9. The multiplier 9 produces a multiplied result of the delayed average electric power value and a predetermined coefficient.

The amplitude-of-received signal decision unit 12 compares the electric power value (FIG. 16(a)) of the received signal supplied to the input terminal S11 with the threshold (FIG. 16(d)) produced by the multiplier 9 to decide a magnitude of electric power of the electric power value of the received signal and produces a decided result to the output terminal S12. The waveform obtained when the electric power value of the received signal shown in FIG. 16(a) is superposed on the threshold shown in FIG. 16(d) is shown in FIG. 16(e) and the comparison result thereof is also shown in FIG. 16(f). In this example, the section in which "L" continues (for a predetermined time) is decided as the null section. Further, since the average electric power value 117 in the section containing the null section in FIG. 16(c) has a near zero value, the amplitude-of-received signal decision unit 12 continuously produces "H" in the section in which the near zero value is used as the threshold as shown by a level decision value 118 of FIG. 16(f). Accordingly, the average electric power value 117 being near zero value in the section containing the null section does not influence detection of the null section adversely.

The reason why the delayed average electric power value produced by the delay unit 7 is level converted by the multiplier 9 is now described.

When level variation of the received signal is small and mixing of noise into the null section is also small, a difference in the electric power value of the received signal between the null section 115 and the data symbols before and after the null section is large as shown in FIG. 16(e). Accordingly, even when the delayed average electric power value shown in FIG. 16(c) is used as the threshold as it is, the output of the amplitude-of-received signal decision unit 12 is "L" for the predetermined time as shown in FIG. 16(f), so that the null section can be detected.

Figure 17A:
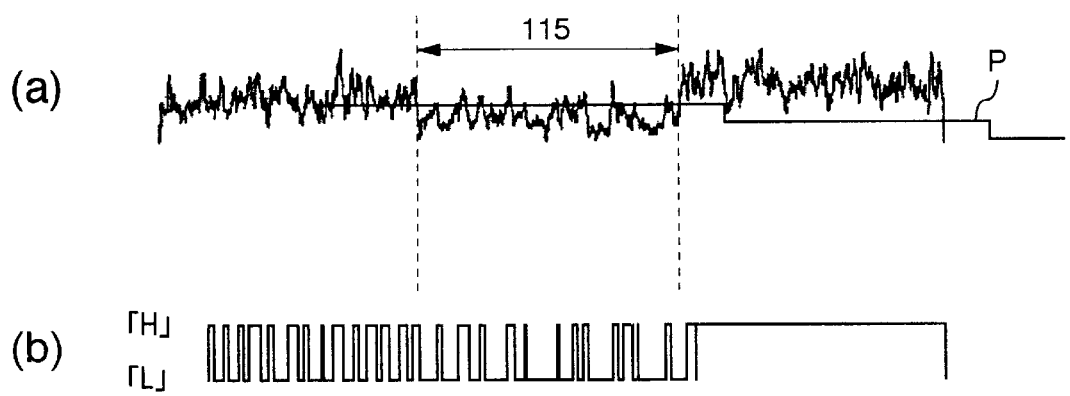
FIGS. 17A and 17B show waveforms useful to explaining a received signal level and a setting operation of a threshold according to the present invention.

However, when the level variation of the received signal is large and mixing of noise into the null section is increased, a difference in the electric power value of the received signal between the null section and the data symbols before and after thereof is reduced. Accordingly, when the delayed average electric power value produced by the delay unit 7 is used as the threshold as it is, portions that the electric power value of the received signal exceeds the threshold in the null section 115 occur as shown at (a) in FIG. 17A, so that the output of the amplitude-of-received signal decision unit 12 is not "L" continuously for the predetermined time as shown at (b) in FIG. 17A and the null section cannot be detected.

Taking such into consideration, assuming that the delayed average electric power value of the delay unit 7 shown in FIG. 16(c) is P, the multiplier 9 performs the level conversion processing of P×a+b, where a and b are real numbers. Here, it is so set that a=½ and b=3, for example. At this time, when P=0 dBm, the threshold is given by $$P \times a + b = 0 \text{ dBm} \times (\frac{1}{2}) + 3 \text{ dBm} = -3 \text{ dBm} + 3 \text{ dBm} = 0 \text{ dBm}.$$

That is, the delayed average electric power value produced by the delay unit 7 is level shifted to be an intermediate level between the electric power value of the received signal in the null section and the average electric power value of the received signal in the data symbol in accordance with the level variation of the electric power value of the received signal and mixing of noise into the null section.

Figure 17B:
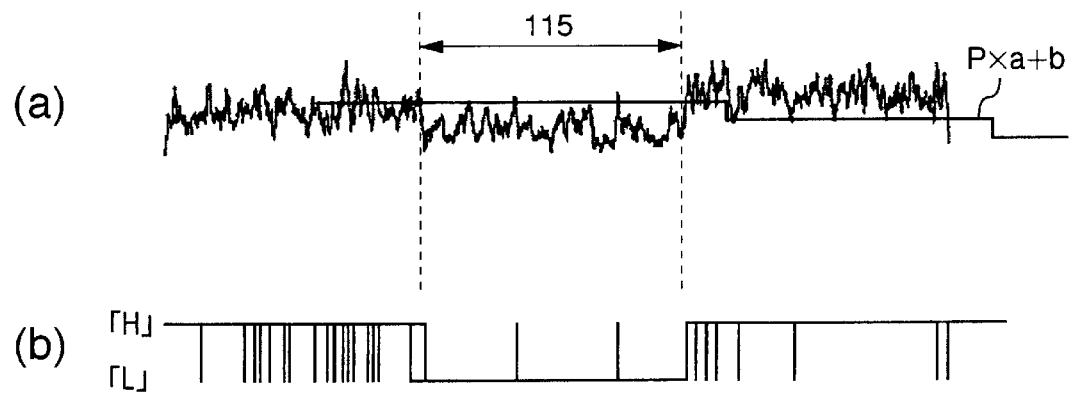

Consequently, as shown at (a) in FIG. 17B, the electric power value of the received signal hardly exceeds the level-shifted threshold in the null section 115. Accordingly, the output of the amplitude-of-received signal decision unit 12 is "L" for the predetermined time as shown at (b) in FIG. 17B, so that the null section can be detected exactly even in this case.

As described above, the threshold can be varied in accordance with the electric power value of the received signal to thereby detect the null section exactly even when mixing of noise is increased or multi-path fading occurs.

Figure 18:
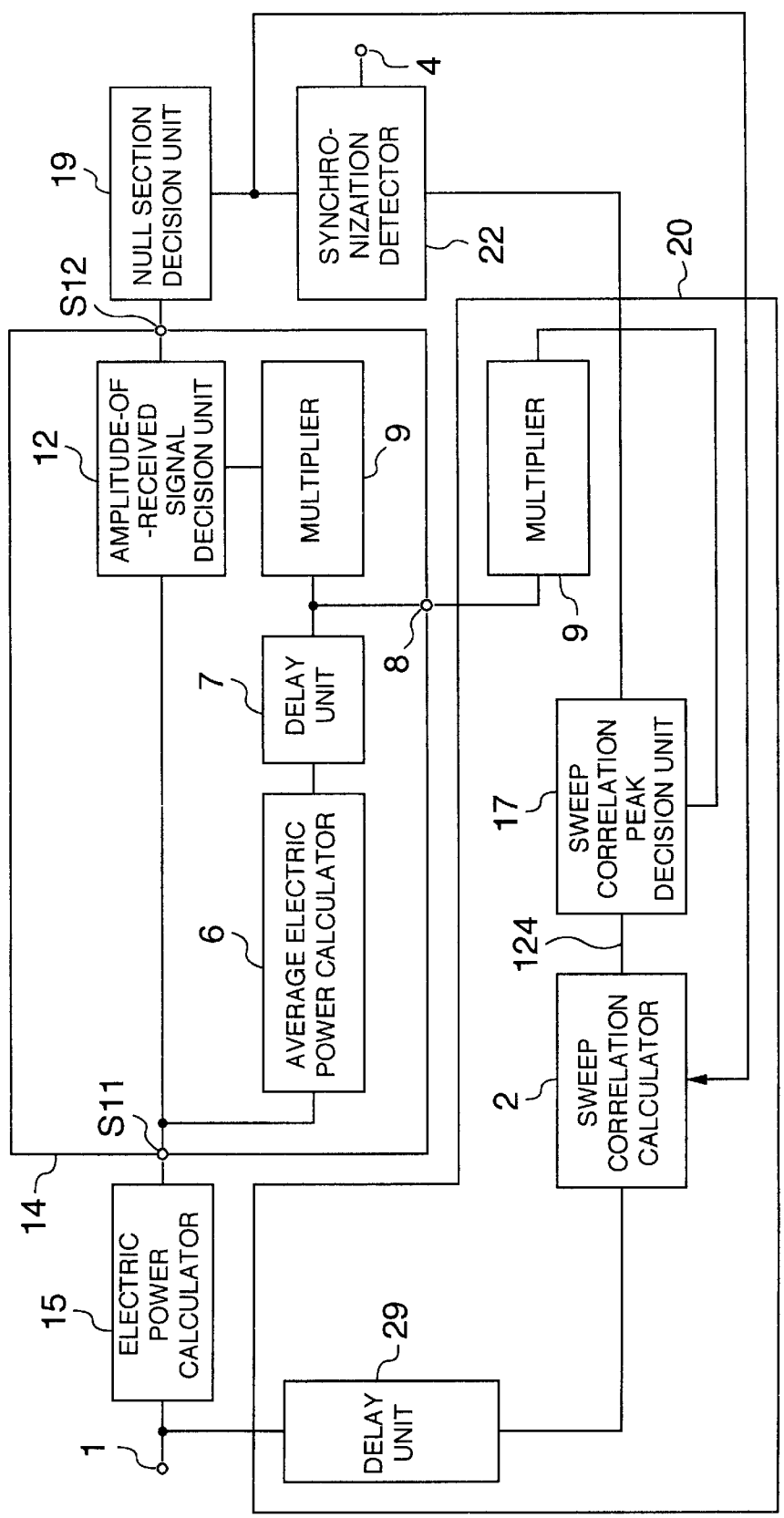
FIG. 18 is a block diagram schematically illustrating another embodiment of a synchronization detection unit of the present invention.

Referring now to FIG. 18, another embodiment of the present invention is described.

FIG. 18 schematically illustrates a synchronization detection unit of a demodulator in the receiver of the digital data transmission apparatus in which the transmission signal in which the null section is inserted at regular intervals is received and the electric power value of the received signal is calculated to decide a magnitude of the calculated electric power value by a comparator so that the null section is detected to attain synchronization with the received signal and illustrates an example in which the embodiment shown in FIG. 14 is incorporated.

The transmission signal received by the demodulator in the receiver not shown is A/D converted and the converted digital received signal is applied to the input terminal 1. The digital received signal applied to the input terminal 1 is supplied to the electric power calculator 15 in which an average electric power value is obtained.

The received level decision unit 14 of the adaptive type decides a magnitude of the average electric power value. When the decided signal is larger than a predetermined threshold, the signal is "H" level (or "L" level) and when the signal is smaller than the threshold, the signal is "L" level (or "H" level).

The output itself of the received level decision unit 14 is used to only decide a magnitude of the received signal as described above and accordingly whether the "H" or "L" level continues for the predetermined time or not is not judged.

Accordingly, the null section detector 19 examines an output level of the received level decision unit 14 so that whether the "H" or "L" level continues for the predetermined time or not is judged to thereby decide the presence of the null section. Further, in addition to decision as to whether the "H" or "L" level continues for the predetermined time or not, the null section detector 19 may decide whether the total time of the "H" or "L" level in one symbol period is longer than or equal to the predetermined time or not to thereby decide the presence of the null section.

With the above configuration, a magnitude of the electric power value of the received signal can be decided on the basis of the threshold varied in accordance with the electric power value of the received signal to thereby detect the null section in which the "H" or "L" level continues for the predetermined time exactly.

Still another embodiment of the present invention is now described with reference to FIG. 18.

In this embodiment, an average electric power is used to recover synchronization of the transmitter and the receiver.

In the above embodiments, the null section is detected from the signal received in the receiver so that an approximate synchronization position can be matched.

However, in order to demodulate the received signal in the receiver exactly, the receiver is required to adjust the synchronization position to the accuracy of the clock period of the received signal.

In one system thereof, a synchronization symbol for indicating a particular point of time on a time axis is inserted in the transmission signal to be transmitted in the transmitter in addition to the null symbol.

The inserted signal includes a sweep signal varying from a predetermined maximum frequency to minimum frequency, a PN code or the like.

Figure 19:
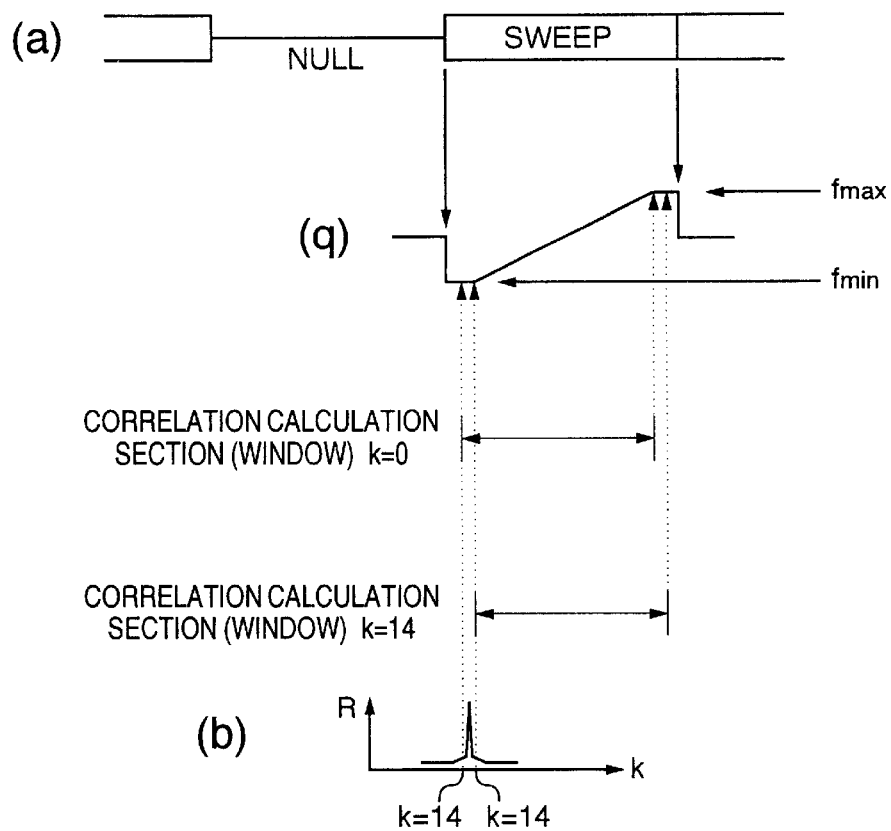
FIG. 19 shows waveforms useful for explaining sweep correlation calculation in the present invention.

The case where a sweep symbol is inserted subsequent to a null symbol as shown in FIG. 19($a$) is now described by way of example. A frequency component contained in the sweep signal is shown in FIG. 19($b$).

The receiver performs correlation calculation between a reference signal equivalent to a frequency pattern of the sweep signal set in the receiver and the received signal shown in FIG. 19($a$).

As shown in FIG. 19, the correlation calculation detects a peak of a correlation value in one symbol period while shifting a sample point for starting the correlation calculation successively.

With respect to the start timing of the correlation calculation, the received signal supplied to a sweep correlation calculator 2 in the correlation calculation unit 20 is delayed by a delay unit 29 by the delay amount in the received level decision unit 14 as shown in FIG. 18, for example, and the correlation calculation is started in response to the null section decision output from the null section decision unit 19, so that the correlation calculation can be performed from the beginning of the sweep signal subsequent to the null section.

When the start point of the correlation calculation is shifted successively from k=0 to k=14, for example, the correlation calculation result is plotted as shown in FIG. 19($b$). The abscissa represents a sample point and the ordinate represents a correlation value. Further, FIG. 20 is an enlarged view of FIG. 19($b$).

Figure 20:
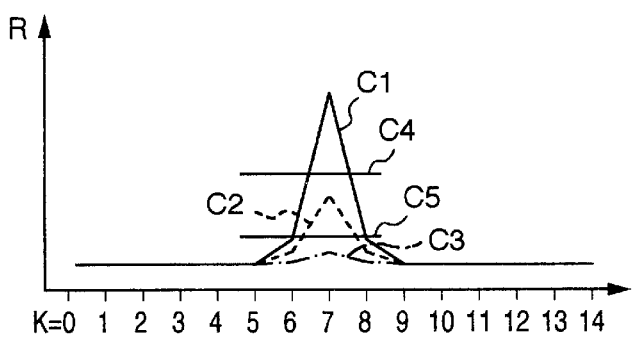
FIG. 20 shows another waveform useful for explaining sweep correlation calculation in the present invention.

In the receiver of the embodiment, if it is assumed that when there is a sharp peak at a point of k=7 and that synchronization is recovered in the receiver exactly, a sharp peak (maximum value) is present at k=7 in the example of FIG. 20 and accordingly it is understood that synchronization can be recovered exactly.

In this connection, the correlation value is directly proportional to the received signal level. Further, the correlation value is sometimes small due to noise.

Accordingly, in order to recover synchronization more exactly, it is judged whether there is significance in the peak value of correlation calculation or not.

Referring now to FIGS. 18 and 20, the judgment method of the significance is described.

In FIG. 18, the digital received signal is subjected to the sweep correlation calculation in the sweep correlation calculator 2 to obtain a sweep correlation value 124. The sweep correlation value 124 is shown by C1 of FIG. 20.

A sweep correlation peak decision unit 17 of the correlation calculator 20 shown in FIG. 18 judges a magnitude of the maximum value of the sweep correlation value 124 to judge whether there is the significance in the sweep correlation value or not. At this time, the threshold used for judgment of the significance of the magnitude of the maximum value of the sweep correlation value is the level-converted value by the multiplier 9' of the delayed electric power value of the received signal which in turn is produced by the delay unit 7 of the level-of-received signal decision unit 14 of the adaptive type as described above.

The reason why the threshold is varied is because the sweep correlation calculation result is varied in proportion to the level of the received signal.

More particularly, even if the threshold shown by C4 of FIG. 20 is suitable for a standard level of the received signal, a threshold shown by C5 of FIG. 20 is more suitable when a level of the received signal is varied to be small.

Finally, when the synchronization detector 22 detects both of a decision signal indicative of the presence of the null section supplied from the null section decision unit 19 and a decision signal supplied from the sweep correlation peak decision unit 17, the synchronization detector 22 judges that synchronization of the transmitter and the receiver is detected and produces a synchronization detection flag 4.

With the above processing, even when noise is mixed in the symbol portion (null section) indicating the particular point of time on the time axis of the received signal or the level of the received signal is varied due to fading, synchronization is prevented from being detected in error.

As described above, according to the embodiments, the threshold for deciding the magnitude of the electric power of the received signal is varied in accordance with the average electric power value of the data symbols in which the null section of the received signal is not contained and accordingly even when large noise is mixed in the received signal or multi-path fading occurs so that the level of the received signal is varied, the null section can be detected exactly and stable detection of synchronization can be attained even in a transmission path having bad conditions.

What is claimed is:

1. A synchronization detection method used in a data transmission apparatus using a digital modulation system and in which a transmission signal transmitted from a transmitting side of said transmission apparatus and having a group of predetermined synchronization symbols containing a no-signal period for synchronization recovery on a receiving side inserted therein at predetermined intervals is received to detect said no-signal times from said received transmission signal, comprising the steps of:

calculating an electric power value of an average signal of said received transmission signal for each predetermined period successively;

determining a threshold for use as a reference of decision for detecting said no-signal period on the basis of said average signal electric power value calculated for each of said predetermined periods successively; and detecting said no-signal period by using said threshold to thereby perform the synchronization recovery.

2. A synchronization detection method according to claim 1, wherein said predetermined period for calculating said average signal electric power value is N (N is a natural number) times a symbol period of said transmission signal.

3. A synchronization detection method according to claim 1, wherein said step of detecting said no-signal period includes a step of comparing an electric power value of said received signal being received during a current predetermined period with a threshold determined on the basis of an average signal electric power value in said predetermined period preceding to said current predetermined period.

4. A synchronization detection method according to claim 1, wherein said step of determining said threshold includes a step of delaying said average signal electric power value calculated for each of said predetermined periods to produce a delayed average signal electric power value successively so that said threshold is successively determined on the basis of said delayed average signal electric power value.

5. A synchronization detection method according to claim 4, wherein when said delayed average signal electric power value is produced, said average signal electric power value is delayed by c (c is a positive real number) times a symbol period of said transmission signal.

6. A synchronization detection method according to claim 1, wherein said threshold is calculated on the basis of P×a+b, where P is said average signal electric power value and a and b are real numbers.

7. A synchronization detection method according to claim 1, wherein said group of synchronization symbols of said transmission signal includes a sweep signal subsequent to said no-signal period, and further comprising a step of performing correlation calculation between said sweep signal and a reference signal equivalent to said sweep signal while shifting a start point of said correlation calculation successively to detect synchronization from a peak correlation value exactly.

8. A synchronization detection method according to claim 7, wherein said peak correlation value is decided and detected by means of another threshold determined on the basis of said average signal electric power value calculated for each of said predetermined period.

9. A synchronization detection method according to claim 7, wherein said correlation calculation is started in response to detection of said no-signal period.

10. A receiving side apparatus of a data transmission apparatus using an orthogonal frequency, division multiplex modulation system and transmitting a transmission signal in which a group of predetermined synchronization symbols containing a no-signal period for synchronization recovery in a receiving side is inserted at predetermined intervals in a transmission signal side, comprising:

average electric power value calculation means for calculating an average signal electric power value of said transmission signal received, for each predetermined period successively;

threshold calculation means for calculating a threshold for use as a reference of decision for detecting said no-signal period on the basis of said average signal electric power value successively; and amplitude-of-received signal decision means for deciding an amplitude of said received transmission signal by using said threshold so as to detect said no-signal period.

11. A receiving side apparatus according to claim 10, wherein said average electric power value calculation means calculates said average signal electric power value of said received transmission signal every N (N is a natural number) times a symbol period of said transmission signal.

12. A receiving side apparatus according to claim 10, further comprising delay means for delaying said average signal electric power value produced by said average electric power value calculation means, and wherein said threshold calculation means calculates said threshold from a delayed average signal electric power value produced by said delay means.

13. A receiving side apparatus according to claim 12, wherein said delay means delays said average signal electric power value by c (c is a positive real number) times a symbol period of said transmission signal.

14. A receiving side apparatus according to claim 12, wherein said threshold calculation means calculates said threshold on the basis of pxa+b where p is said delayed average signal electric power value and a and b are real numbers.

15. A receiving side apparatus according to claim 10, wherein said group of synchronization symbols of said transmission signal includes a sweep signal subsequent to said no-signal period, and further comprising correlation calculation means for performing correlation calculation between said sweep signal and a reference signal equivalent to said sweep signal while shifting a start point of said correlation calculation successively to detect synchronization from a peak correlation value exactly.

16. A receiving side apparatus according to claim 15, wherein said correlation calculation means includes means for determining another threshold on the basis of said average signal electric power value calculated for each of said predetermined period to decide and detect said peak correlation value on the basis of said another threshold.

17. A receiving side apparatus according to claim 15, wherein said correlation calculation means starts said correlation calculation in response to detection of said no-signal period.

18. A receiving side apparatus of a data transmission apparatus using an orthogonal frequency division multiplex modulation system and transmitting a transmission signal in which a group of predetermined synchronization symbols containing a no-signal period for synchronization recovery on a receiving side is inserted at predetermined intervals on a transmission signal side, comprising:

an average electric power value calculation unit supplied with said transmission signal received and producing an average signal electric power value of said received transmission signal for each predetermined period successively;

a threshold calculation unit supplied with said average signal electric power value and producing a threshold for use as a reference of decision for detecting said no-signal period successively; and an amplitude-of-received signal decision unit supplied with said received transmission signal and said threshold and deciding an amplitude of said received transmission signal.

19. A receiving side apparatus according to claim 18, further comprising a delay unit supplied with said average signal electric power value from said average electric power value calculation unit and producing a delayed average signal electric power value, and wherein said threshold calculation unit receives said delayed average signal electric power value and produces said threshold successively.

20. A receiving side apparatus according to claim 18, wherein said average electric power value calculation unit produces said average signal electric power value every N (N is a natural number) times a symbol period of said transmission signal.

21. A receiving side apparatus according to claim 18, wherein said delay unit delays said average signal electric power value by c (c is a positive real number) times a symbol period of said transmission signal.

22. A receiving side apparatus according to claim 18, wherein said threshold calculation unit calculates said threshold on the basis of pxa+b where p is said delayed average signal electric power value and a and b are real numbers.

23. A receiving side apparatus according to claim 18, wherein said group of synchronization symbols of said transmission signal includes a sweep signal subsequent to said no-signal period, and further comprising a correlation calculation unit supplied with said sweep signal and a reference signal equivalent to said sweep signal and producing a correlation calculation value while shifting a start point of correlation calculation successively to detect synchronization from a peak correlation value exactly.

24. A receiving side apparatus according to claim 23, wherein said correlation calculation unit includes a threshold calculator supplied with said average signal electric power value calculated for each of said predetermined period and producing another threshold, so that said peak correlation value is decided and detected on the basis of said another threshold.

25. A receiving side apparatus according to claim 23, wherein said correlation calculation unit starts said correlation calculation in response to detection of said no-signal period.

* * * * *